United States Patent Office 3,639,391
Patented Feb. 1, 1972

3,639,391
PROCESS FOR REARRANGEMENT OF CYCLO-ALKANONE OXIME TO LACTAM
William F. Yates, Chesterfield, Ronald O. Downs, Creve Coeur, and James C. Burleson, Clayton, Mo., assignors to Monsanto Company, St. Louis, Mo.
No Drawing. Filed Aug. 22, 1969, Ser. No. 852,502
Int. Cl. C07d 41/06
U.S. Cl. 260—239.3                                   6 Claims

ABSTRACT OF THE DISCLOSURE

Boron trioxide supported on thoria having a surface area of at least about 100 square meters per gram provides a catalyst particularly useful in the vapor phase, catalytic rearrangement of cyclic ketoximes to the corresponding lactams; for example, in the vapor phase process for the rearrangement of cyclohexanone oxime to caprolactam.

BACKGROUND OF THE INVENTION

It is known that cyclic ketoximes, for example cyclohexanone oxime, can be rearranged in the vapor phase to the corresponding lactam with the aid of a solid catalyst. Numerous catalysts have been suggested or reported in the literature for carrying out this rearrangement, for example, heteropolyacids, phosphorus acids, alkali bisulfates or boric acid which are usually applied to carriers. As carrier material, aluminum oxide, diatomaceous earth, active cokes, titanium dioxide and tin dioxide have been used or proposed. Other catalysts which have also been reported include silica/alumina cracking catalysts and copper on silica gel. However, these catalysts are not entirely satisfactory for large scale commercial processes for one or more reasons, namely, the catalysts are difficult or expensive to provide; not easily regenerated, if at all; do not provide a desirable yield or selectivity of lactam; the activity thereof decreases to an unacceptable level in a relatively short period of time or is adversely affected by the presence of a carrier gas, such as hydrogen.

An object of the invention therefore is to provide a new catalyst for use in the vapor phase, catalytic rearrangement of cyclic ketoximes to the corresponding lactam which does not suffer from any of the above-mentioned disadvantages.

SUMMARY OF THE INVENTION

The object of the invention is accomplished by the discovery that boron trioxide deposited on thoria (ThO$_2$), wherein the thoria has a surface area of at least about 100 square meters per gram (m.$^2$/gm.) and, preferably, 100 to 200 m.$^2$/gm., provides an excellent catalyst for the vapor phase catalytic rearrangement of cyclic ketoximes to the corresponding lactam. The specified surface area of the thoria support is essential to the successful catalytic behavior of the catalyst. Accordingly, thoria supports having a surface area of substantially less than 100 m.$^2$/gm. are unsatisfactory. On the other hand, if the surface area is too great, the surface pores of the thoria are easily plugged due to the minute size thereof causing deactivation of the catalyst.

BRIEF DESCRIPTION OF THE PREFERRED EMBODIMENTS

The catalyst

The catalyst of the invention consists of boron trioxide deposited on a thoria support characterized in that the thoria has a surface area of at least about 100 m.$^2$/gm., e.g. 100 to 150 m.$^2$/gm.

The catalyst is conveniently prepared by forming a saturated aqueous solution of boric acid or boron trioxide; adding thoria (pellets) having a surface area of between 100 and 200 m.$^2$/gm. to the solution in an amount so that an excess of the boron compound is present, that is, more boron compound is present than can actually be deposited onto the thoria; removing excess water; drying the mixture; and subsequently screening to remove fines. When the mixture is dried and calcined, any boric acid present is converted to boron trioxide. The catalyst preferably contains the maximum amount of boron trioxide, i.e., about 10 weight percent, calculated as boric acid B(OH)$_3$. Any form of boric acid may be employed to prepare the catalyst, i.e., meta-, ortho-, per- or pyro-, since all forms go to boron trioxide during the calcination of the catalyst. The particular procedure used in obtaining the boron trioxide deposited on the thoria is not critical so long as the resulting catalyst has a thoria surface area of at least about 100 m.$^2$/gm.

Oxime rearrangement reaction conditions

In general, oxime vapors which may contain minor amounts of water, e.g. up to about 2 mole percent, are brought into contact with the catalyst at elevated temperatures, i.e., temperatures sufficient to maintain the oxime in the vapor state without excess decomposition thereof, e.g. 200° C. to 500° C., under near atmospheric or subatmospheric pressures with or without the aid of a carrier gas. Generally, temperatures ranging from 200° to 350° C. are sufficient. Suitable carrier gases include argon, hydrogen, nitrogen, methane, and the like. The catalyst of the present invention has the advantage over catalysts, such as boron trioxide deposited on a sulfite, sulfate or phosphate, in that, hydrogen may be used as a carrier gas without deactivating the catalyst. The catalyst may be set up as a fixed bed or as a fluidized bed.

Preferably, the oxime rearrangement is carried out by passing oxime vapors containing up to 2 mole percent water through a tubular reactor packed with catalyst which has been heated to a temperature between about 300° and 345° C., employing a carrier gas, such as hydrogen. The residence time between the oxime and catalyst may vary from 0.01 second to several minutes, but preferably is from about 0.01 to 10 seconds. When the activity of the catalyst has decreased below an acceptable level, it may be reactivated by passing an oxygen-containing gas, such as air, through the reactor at elevated temperatures, e.g. 500° C.

EXAMPLE I

Catalyst preparation

Boric acid (21.6 grams) was dissolved in warm distilled water. To this solution 36 grams of thoria pellets (⅛ inch) having a surface area of about 150 m.$^2$/gm. (Harshaw thoria 400 S–1) was added. The mixture was slowly agitated and boiled to remove excess water. A slurry formed which was placed in a vacuum oven (25 inches Hg vacuum) and dried at 100° C. The dried mixture was then sieved to remove excess boron trioxide and fines. The catalyst consisting of boric acid deposited on thoria having a surface area of about 150 m.$^2$/gm. was weighed and found to weigh 40 grams. The catalyst was calcined at 200°–400° C. before use.

EXAMPLE II

A tubular reactor (½ inch in diameter) was packed to a depth of 6 inches with catalyst prepared according to the procedure described in Example I. Over a 5 hour period, a vaporous feed consisting of 7.5 ml./min. cyclohexanone oxime at 122° C. and 450 ml./min. argon were fed into the reactor at a pressure sufficient to provide a flow of materials through the reactor. The catalyst was maintained at a temperature of 320° C. At the end of ½ hour, 1 hour, 3 hours and 5 hours a sample of the product was taken and analyzed. The results of each analysis is given in the following table.

TABLE

| Sample No.: | Time elapsed before sample was taken | Percent oxime converted | Yield of caprolactam, weight percent based on oxime converted |
|---|---|---|---|
| 1 | ½ | 99.1 | 92.0 |
| 2 | 1 | 94.5 | 89.0 |
| 3 | 3 | 81.4 | 88.0 |
| 4 | 5 | 68.5 | 86.0 |

EXAMPLE III

The catalyst used in carrying out Example II is regenerated by passing air through the tubular reactor while maintaining the catalyst at a temperature of about 500° C. When the procedure of Example II is repeated using the regenerated catalyst rather than fresh catalyst similar results are obtained.

The invention is by no means restricted to the use of the catalyst for the rearrangement of cyclohexanone oxime to caprolactam. The catalyst can be used to catalyze any intermolecular rearrangement process where a ketoxime forms its isomeric amide, providing the ketoxime can be kept in the vapor phase. The catalyst is particularly suitable in processes for the vapor phase catalytic rearrangement of $C_5$ to $C_{12}$ cycloalkanone oximes to the corresponding lactams, e.g., the rearrangement of cyclopentanone oxime, cyclododecanone oxime and cyclohexanone oximes to the corresponding lactams.

We claim:
1. A process for molecularly rearranging a $C_5$ to $C_{12}$ cyclicalkanone oxime to the corresponding lactam which comprises bringing a $C_5$ to $C_{12}$ cyclicalkanone oxime in the vapor phase into contact with a catalyst at a temperature between about 200° and 500° C., said catalyst consisting essentially of boron trioxide deposited on thoria having a surface area of at least about 100 square meters per gram.
2. The process of claim 1 wherein the temperature is between 200° and 350° C.
3. The process of claim 1 wherein the surface area of the thoria is between about 100 and 200 square meters per gram.
4. The process of claim 1 wherein said oxime is cyclohexanone oxime.
5. The process of claim 1 wherein the oxime vapors contain water vapor.
6. The process of claim 5 wherein the oxime vapors contain up to 2 mole percent water vapor.

References Cited

UNITED STATES PATENTS 3,154,539  10/1964  Irnich et al. _____ 260—239.3
3,210,338  10/1965  Huber et al. _____ 260—239.3

HENRY R. JILES, Primary Examiner
R. T. BOND, Assistant Examiner

U.S. Cl. X.R.

260—294.7 F; 252—432